US012365205B2

(12) United States Patent
Nishio (10) Patent No.: US 12,365,205 B2
(45) Date of Patent: Jul. 22, 2025

(54) PNEUMATIC TIRE (71) Applicant: The Yokohama Rubber Co., LTD., Tokyo (JP)

(72) Inventor: Koji Nishio, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 531 days.

(21) Appl. No.: 17/284,640

(22) PCT Filed: Oct. 7, 2019

(86) PCT No.: PCT/JP2019/039517
§ 371 (c)(1),
(2) Date: Apr. 12, 2021

(87) PCT Pub. No.: WO2020/090362
PCT Pub. Date: May 7, 2020

(65) Prior Publication Data
US 2021/0394565 A1 Dec. 23, 2021

(30) Foreign Application Priority Data
Nov. 2, 2018 (JP) ................................. 2018-207509

(51) Int. Cl.
*B60C 15/06* (2006.01)
*B60C 9/00* (2006.01)
(Continued)

(52) U.S. Cl.
CPC ........ *B60C 15/0628* (2013.01); *B60C 9/0007* (2013.01); *B60C 9/08* (2013.01);
(Continued)

(58) Field of Classification Search
CPC . B60C 15/06; B60C 15/0603; B60C 15/0607; B60C 2015/061;
(Continued)

(56) References Cited

U.S. PATENT DOCUMENTS 4,688,616 A * 8/1987 Iuchi ...................... B60C 15/06
152/546
5,080,158 A * 1/1992 Kawamura ............. B60C 15/06
152/554
(Continued)

FOREIGN PATENT DOCUMENTS

CN 1621254 A 6/2005
CN 102825984 A 12/2012
(Continued)

OTHER PUBLICATIONS

Machine Translation: JP-2010006322-A, ITO T, (Year: 2023).*

*Primary Examiner* — Kendra Ly
(74) *Attorney, Agent, or Firm* — Thorpe North & Western (57) ABSTRACT

In a pneumatic tire, a bead filler is on an outer circumference of a bead core, a carcass turned up end is inward of an outer diameter side end of the bead filler, the carcass end is spaced from a carcass body, a steel reinforcement is in each bead, a sidewall rubber extends from the sidewall to the bead, and a support layer is between the bead filler and the sidewall rubber to cover the carcass end and an end of the steel reinforcement, the support layer extending toward an outer diameter side and contacting the carcass body on an outer diameter side of the bead filler outer diameter side end, and a 100% modulus of the support layer is at least 1.5 times that of the bead filler, and the sidewall rubber, the bead filler and the sidewall rubber being adjacent to the support layer.

19 Claims, 7 Drawing Sheets (51) Int. Cl.
*B60C 9/08* (2006.01)
*B60C 15/00* (2006.01)

(52) U.S. Cl.
CPC ...... *B60C 15/0009* (2013.01); *B60C 15/0603* (2013.01); *B60C 15/0635* (2013.01); *B60C 2015/061* (2013.01); *B60C 2015/0614* (2013.01); *B60C 2015/0621* (2013.01); *B60C 2015/0625* (2013.01); *B60C 2200/06* (2013.01)

(58) Field of Classification Search
CPC .... B60C 2015/0614; B60C 2015/0617; B60C 2015/0621; B60C 2015/0625
See application file for complete search history.

(56) References Cited

U.S. PATENT DOCUMENTS

| | | | |
|---|---|---|---|
| 2004/0007305 A1* | 1/2004 | Ueyoko | B60C 15/0027 152/552 |
| 2005/0109441 A1 | 5/2005 | Sugiyama et al. | |
| 2012/0318427 A1 | 12/2012 | Nishio | |
| 2013/0037196 A1* | 2/2013 | Kodama | B60C 15/0635 152/541 |
| 2017/0217258 A1* | 8/2017 | Todoroki | B60C 15/06 |
| 2018/0370295 A1 | 12/2018 | Nishio | |
| 2019/0009621 A1* | 1/2019 | Gohara | B60C 15/024 |
| 2019/0184766 A1* | 6/2019 | Krier | B60C 15/0607 |

FOREIGN PATENT DOCUMENTS

| | | | | |
|---|---|---|---|---|
| CN | 102922954 A | 2/2013 | | |
| CN | 108367635 A | 8/2018 | | |
| CN | 108473004 A | 8/2018 | | |
| DE | 102012106960 A1 | 2/2013 | | |
| JP | 59-109406 A | 6/1984 | | |
| JP | S63-110006 A | 5/1988 | | |
| JP | H06-183224 A | 7/1994 | | |
| JP | 2005-178618 A | 7/2005 | | |
| JP | 2010006322 A | * 1/2010 | ......... | B60C 15/0607 |
| JP | 2013-1223 A | 1/2013 | | |
| JP | 2013-35407 A | 2/2013 | | |
| JP | 5319736 B2 | 10/2013 | | |
| JP | 2016-120832 A | 7/2016 | | |
| JP | 2017-114451 A | 6/2017 | | |
| JP | 2017-114459 A | 6/2017 | | |
| JP | 2018-100043 A | 6/2018 | | |
| JP | 6594509 B1 | 10/2019 | | |
| WO | 2017/110635 A1 | 6/2017 | | |
| WO | WO-2017110643 A1 | * 6/2017 | ............. | B60C 15/00 |

* cited by examiner

FIG. 7

PNEUMATIC TIRE

TECHNICAL FIELD

The present technology relates to a pneumatic tire in which a carcass layer including steel cords is turned up around a bead core of each bead portion from a tire inner side to a tire outer side, and particularly relates to a pneumatic tire that can provide bead portions with improved durability.

BACKGROUND ART

In some heavy duty pneumatic tires used for trucks, buses, and the like, a carcass layer including a plurality of steel cords bunched together between a pair of bead portions is mounted and turned up around a bead core of each of the bead portions from a tire inner side to a tire outer side. Typically, a steel reinforced layer including a plurality of steel cords bunched together is disposed in each of the bead portions in such a way as to wrap around the carcass layer, the bead core, and a bead filler. In addition, a high-hardness rubber layer is locally disposed at a turned up end portion of the carcass layer and at an end portion of the steel reinforced layer for the purpose of preventing edge separation (see Japan Unexamined Patent Publication Nos. 1988-110006 and 1994-183224, and Japan Patent No. 5319736, for example).

In a pneumatic tire having such a configuration, as is generally known, in a case where a profile less susceptible to a profile change caused by air pressure inflation, a so-called balanced profile, is adopted, strain amplitude at the turned up end portion of the carcass layer is suppressed, leading to improved durability of the bead portions. Additionally, in order to achieve the balanced profile, the bead core needs to be located closer to a bead toe to prevent the rubber from being thicker on the outer side in the tire width direction than at the turned up end portion of the carcass layer.

However, in a ply lock structure employed in heavy duty pneumatic tires, in a case where the turned up end portion of the steel carcass layer is low and spaced apart from the body portion of the carcass layer, a rubber flow during vulcanization is likely to form rubber banks at or near the turned up end portion of the carcass layer. Thus, the rubber tends to be thicker on the outer side in the tire width direction than at the turned up end portion of the carcass layer. This is because rubber present laterally to the bead core flows toward the tire outer diameter side during vulcanization. Thus, the rubber tends to be thinner laterally to the bead core, and this is a factor that inhibits the balanced profile.

Additionally, in order to make the rubber thinner on the outer side in the tire width direction than at the turned up end portion of the carcass layer, the tire may be molded using thin extrusions in the corresponding area. In this case, the area is likely to be cracked along the tire circumferential direction. In other words, in a case where the rubber is made thinner on the outer side in the tire width direction than at the turned up end portion of the carcass layer, an increased amount of the rubber present laterally to the bead core flows toward the tire outer diameter side during vulcanization. The rubber flow traps a release agent and the like in a surface layer along with the rubber, and this is a factor that causes cracking during an initial traveling stage.

SUMMARY

The present technology provides a pneumatic tire that can provide bead portions with improved durability.

An embodiment of the present technology provides a pneumatic tire including a tread portion extending in a tire circumferential direction and having an annular shape, a pair of sidewall portions respectively disposed on both sides of the tread portion, a pair of bead portions each disposed on an inner side in a tire radial direction of the sidewall portions, and a carcass layer mounted between the pair of bead portions and including a plurality of steel cords, the carcass layer being turned up around a bead core of each of the bead portions from a tire inner side to a tire outer side, a bead filler being disposed on an outer circumference of the bead core of each of the bead portions, a turned up end portion of the carcass layer being disposed on a radially inner side with respect to a radially outer side end portion of the bead filler, the turned up end portion of the carcass layer being spaced apart from a body portion of the carcass layer, a steel reinforced layer that includes a plurality of steel cords being disposed in each of the bead portions in such a manner as to wrap around the carcass layer, the bead core, and the bead filler, and a sidewall rubber layer exposed on a tire outer surface being disposed from the sidewall portion to the bead portion, and a rubber reinforcing support layer being disposed between the bead filler and the sidewall rubber layer in such a manner as to cover a turned up end portion of the carcass layer and an end portion of the steel reinforced layer, the rubber reinforcing support layer at least extending from a position lateral to the bead core toward a radially outer side and contacting a body portion of the carcass layer at a position on a radially outer side with respect to a radially outer side end portion of the bead filler, and a 100% modulus $K_{M100}$ of the rubber reinforcing support layer being at least 1.5 times as large as each of a 100% modulus $BF_{M100}$ of the bead filler and a 100% modulus $S_{M100}$ of the sidewall rubber layer, the bead filler and the sidewall rubber layer being adjacent to the rubber reinforcing layer.

In an embodiment of the present technology, the rubber reinforcing support layer is disposed between the bead filler and the sidewall rubber layer in such a manner as to cover the turned up end portion of the carcass layer and the end portion of the steel reinforced layer, the rubber reinforcing support layer at least extends from the position lateral to the bead core toward the radially outer side and contacting the body portion of the carcass layer at the position on the radially outer side with respect to the radially outer side end portion of the bead filler, and the 100% modulus $K_{M100}$ of the rubber reinforcing support layer is at least 1.5 times as large as each of the 100% modulus $BF_{M100}$ of the bead filler and the 100% modulus $S_{M100}$ of the sidewall rubber layer, the bead filler and the sidewall rubber layer being adjacent to the rubber reinforcing layer. Thus, the rubber reinforcing support layer effectively suppresses a flow of rubber present laterally to the bead core, toward the tire outer diameter side during vulcanization. This suppresses a reduction in the thickness of the rubber present laterally to the bead core and an increase in the thickness of rubber present on the outer side in the tire width direction with respect to the turned up end portion of the carcass layer, enabling a carcass line of the bead portions of the pneumatic tire to be made closer to a target balanced profile. Additionally, the rubber reinforcing support layer suppresses the rubber flow in the bead portion, and thus trapping of a release agent and the like caused by the rubber flow is prevented, allowing suppression of cracking of a bead portion surface during the initial traveling stage. Accordingly, the durability of the bead portions can be improved.

In an embodiment of the present technology, preferably, the rubber reinforcing support layer has a 100% modulus $K_{M100}$ of from 4.5 MPa to 10.0 MPa. Accordingly, the rubber flow during vulcanization is effectively suppressed, allowing suppression of cracking of a bead portion surface during the initial traveling stage.

Preferably, the rubber reinforcing support layer has a thickness TK of from 2.0 mm to 6.0 mm in a region from the turned up end portion of the carcass layer to the radially outer side end portion of the bead filler. Accordingly, the rubber flow during vulcanization is effectively suppressed, allowing suppression of cracking of a bead portion surface during the initial traveling stage.

Preferably, the rubber reinforcing support layer includes a crack suppression layer contacting the turned up end portion of the carcass layer and an end portion of the steel reinforced layer, and a rubber reinforcing body layer contiguous with the crack suppression layer, the crack suppression layer has an elongation at break $Kc_{EB}$ of 300% or more, and a 100% modulus $Km_{M100}$ of the rubber reinforcing body layer is greater than a 100% modulus $Kc_{M100}$ of the crack suppression layer. In this manner, separation can be effectively suppressed by increasing the elongation at break $Kc_{EB}$ of the crack suppression layer contacting the turned up end portion of the carcass layer and the end portion of the steel reinforced layer, whereas increasing the 100% modulus $Km_{M100}$ of the rubber reinforcing body layer allows suppression of rubber flow during vulcanization and effective suppression of cracking of the bead portion surface during the initial traveling stage.

Preferably, the crack suppression layer has a length Ic of 30 mm or more in a region from the turned up end portion of the carcass layer to the radially outer side end portion of the bead filler, and the crack suppression layer has a thickness Tc of 3.0 mm or more at the turned up end portion of the carcass layer. This allows effective suppression of separation of the carcass layer originating from the turned up end portion and the end portion of the steel reinforced layer.

Preferably, a distance A measured along a straight line extending through an apex of the bead core projecting farthest to the outer side in the width direction, the straight line extending parallel to a long side of the bead core and the distance A being measured from the apex to a bead heel position, is 2.5 mm or more, and a shortest distance $T_1$ from the turned up end portion of the carcass layer to an outer surface of the bead portion is 10 mm or less. This allows formation of a carcass line less susceptible to a profile change caused by air pressure inflation (i.e., a balanced profile). Thus, strain amplitude at the turned up end portion of the carcass layer is suppressed, allowing effective suppression of separation of the carcass layer originating from the turned up end portion.

Preferably, a shortest distance $T_{BF}$ from the turned up end portion of the carcass layer to the body portion of the carcass layer and the shortest distance $T_1$ from the turned up end portion of the carcass layer to the outer surface of the bead portion satisfy a relationship 0.5 $0 \leq T_1/T_{BF} \leq 0.65$. This effectively suppresses separation of the carcass layer originating from the turned up end portion and suppresses trapping of rubber at or near the turned up end portion of the carcass layer, allowing effective suppression of cracking of the bead portion surface during initial traveling stage.

Preferably, a distance $P_h$ from a center of the bead core to the turned up end portion of the carcass layer ranges from 26.0 mm to 40.0 mm, the shortest distance $T_{BF}$ from the turned up end portion of the carcass layer to the body portion of the carcass layer is 11.0 mm or more, and the shortest distance $T_1$ from the turned up end portion of the carcass layer to the outer surface of the bead portion is 7.0 mm or more. This allows effective suppression of separation of the carcass layer originating from the turned up end portion.

Preferably, the distance $P_h$ from the center of the bead core to the turned up end portion of the carcass layer and a distance $S_{ho}$ from the center of the bead core to the end portion of the steel reinforced layer satisfies a relationship 5.0 mm$\leq P_h - S_{ho}$. This mitigates stress concentration at the turned up end portion of the carcass layer and the end portion of the steel reinforced layer, allowing suppression of separation originating from these end portions.

Preferably, the bead filler includes a hard filler layer located on the radially inner side and a soft filler layer located on the radially outer side, the hard filler layer has a 100% modulus $B1_{M100}$ of from 6.0 MPa to 18.0 MPa, and the soft filler layer has a 100% modulus $B2_{M100}$ of from 1.0 MPa to 6.0 MPa. This allows effective suppression of separation of the carcass layer originating from the turned up end portion.

Preferably, the pneumatic tire according to an embodiment of the present technology has a load index of 121 or more on a single wheel, or a ply rating of 10 PR or more. Pneumatic tires having such a load index or ply rating are generally heavy duty tires. The present technology is expected to produce significant effects on heavy duty pneumatic tires.

In the present technology, the 100% modulus and the elongation at break are measured in accordance with JIS (Japanese Industrial Standard) K 625 1.

DETAILED DESCRIPTION

Figure 1:
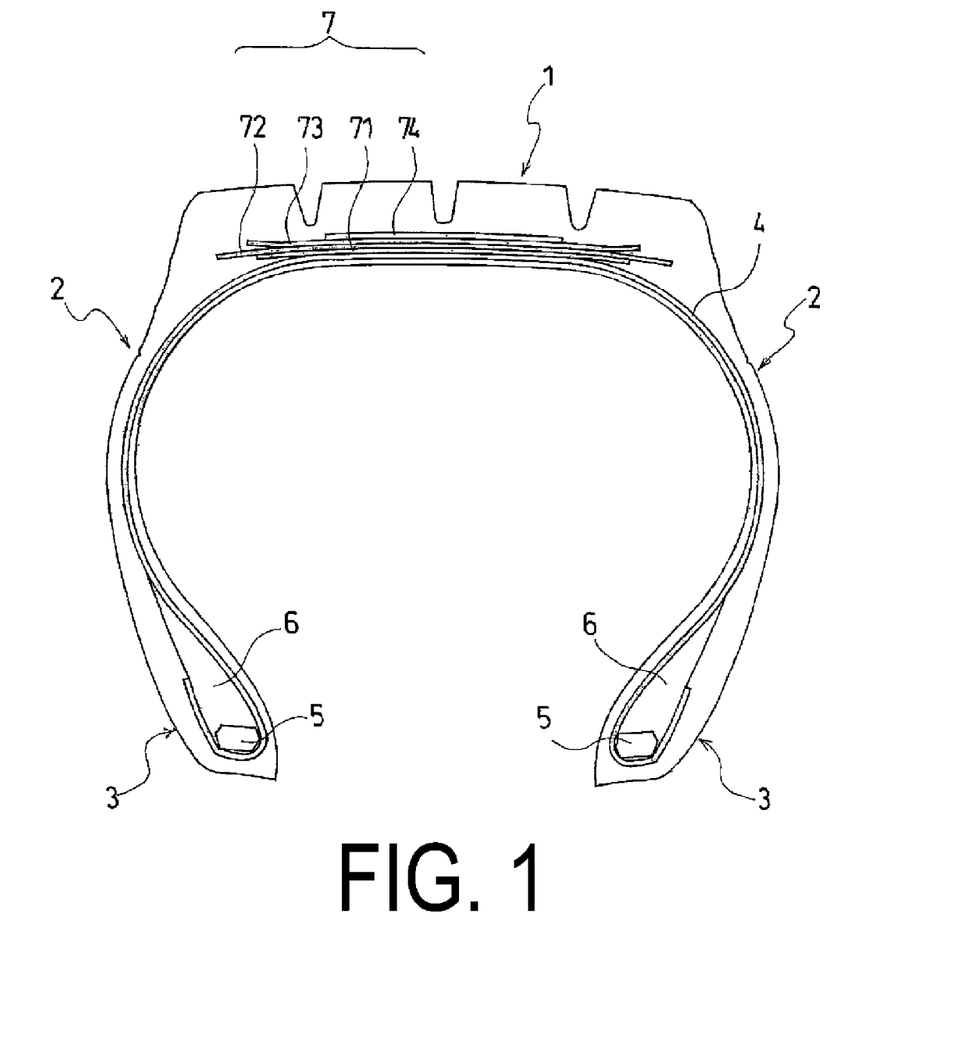
FIG. 1 is a meridian cross-sectional view illustrating a heavy duty pneumatic tire according to an embodiment of the present technology.
Figure 2:
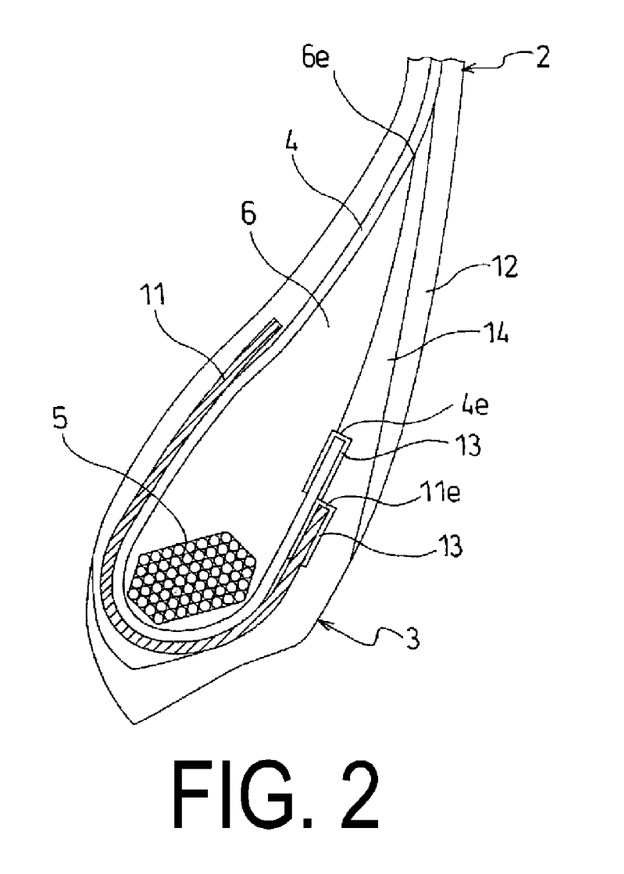
FIG. 2 is a cross-sectional view of a bead portion of the pneumatic tire in FIG. 1.
Figure 3:
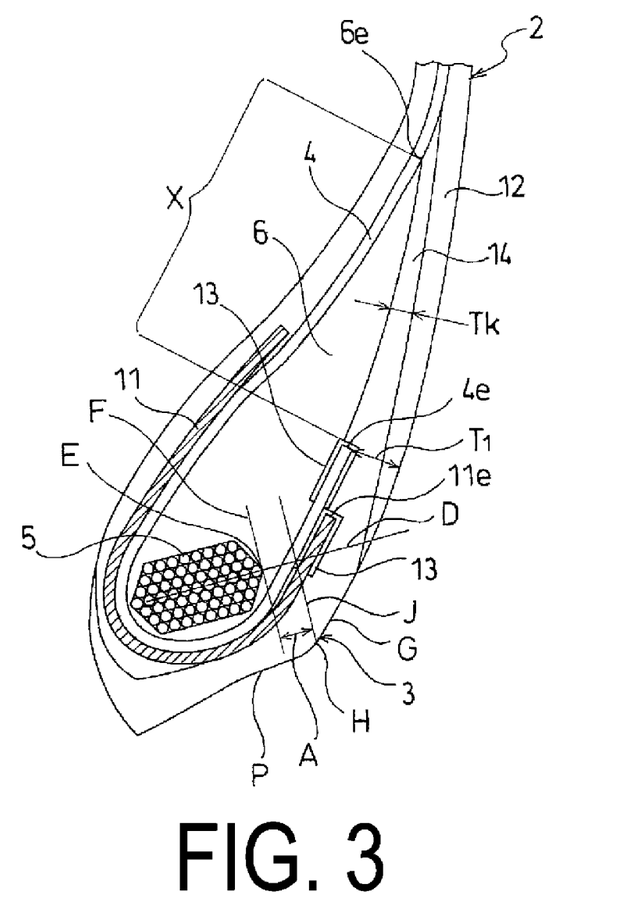
FIG. 3 is another cross-sectional view illustrating the bead portion of the pneumatic tire in FIG. 1.
Figure 4:
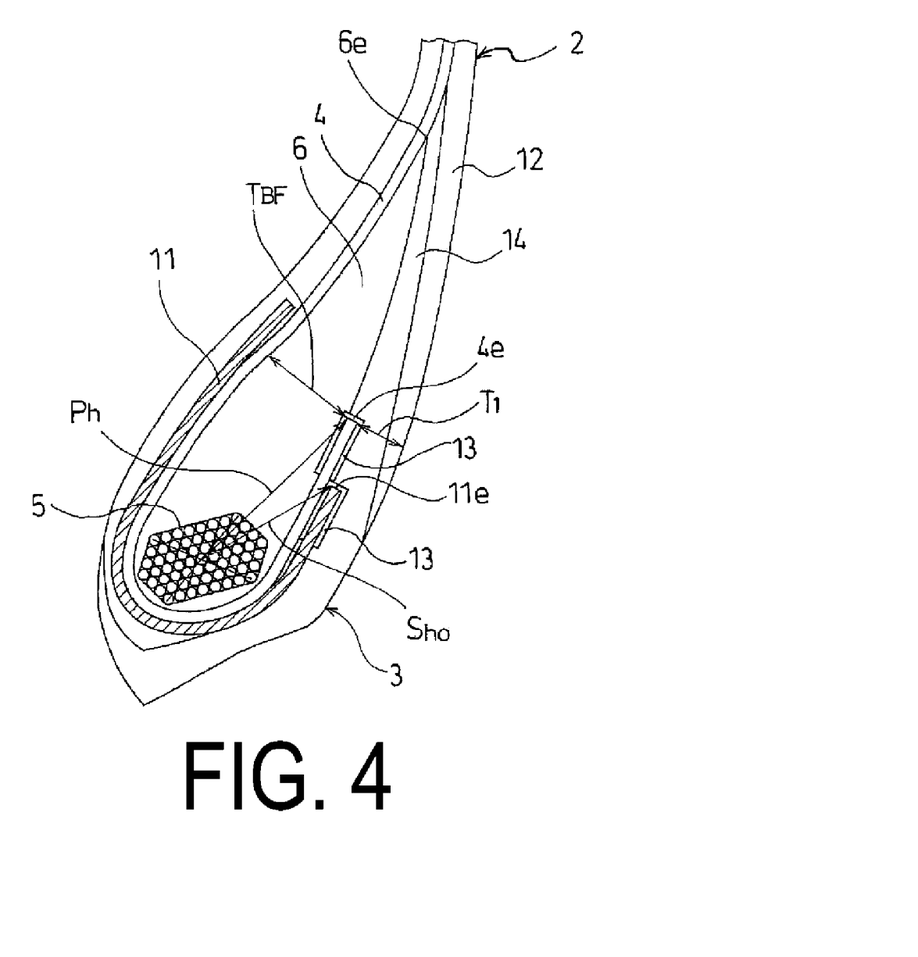
FIG. 4 is yet another cross-sectional view illustrating the bead portion of the pneumatic tire in FIG. 1.

Configurations of embodiments of the present technology will be described in detail below with reference to the accompanying drawings. FIG. 1 illustrates a heavy duty pneumatic tire according to an embodiment of the present technology, and FIG. 2 to FIG. 4 illustrate a bead portion of the pneumatic tire.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed on an inner side of the sidewall portions 2 in the tire radial direction.

A carcass layer 4 is mounted between the pair of bead portions 3, 3. The carcass layer 4 includes a plurality of steel cords extending in the tire radial direction and is turned up around a bead core 5 disposed in each of the bead portions 3 from a tire inner side to a tire outer side. A bead filler 6 having a triangular cross-sectional shape and formed of a rubber composition is disposed on the outer circumference of the bead core 5.

Four belt layers 7 are embedded on the radially outer side of the carcass layer 4 in the tread portion 1. Each of the belt layers 7 includes a plurality of belt cords (steel cords) inclined with respect to the tire circumferential direction. The belt layers 7 include two central main belt layers 72 and 73 with belt cords intersecting with each other, and auxiliary belt layers 71 and 74 disposed on the radially inner side and the radially outer side of the main belt layers 72 and 73. The inclination angle of the belt cords constituting the main belt layers 72 and 73 with respect to the tire circumferential direction is set to range from 15° to 35°, for example, and the inclination angle of the belt cords constituting the auxiliary belt layers 71 and 74 with respect to the tire circumferential direction is set to range from 15° to 75°, for example.

In the pneumatic tire described above, as illustrated in FIG. 2, a turned up end portion 4e of the carcass layer 4 is disposed on the radially inner side of a radially outer side end portion 6e of the bead filler 6, that is, the turned up end portion 4e of the carcass layer 4 terminates in a middle portion of the bead filler 6. As a result, the turned up end portion 4e of the carcass layer 4 is spaced apart from the body portion of the carcass layer 4. Here, the turned up end portion 4e of the carcass layer 4 being spaced apart from the body portion of the carcass layer 4 means that the shortest distance $T_{BF}$ (see FIG. 4) from the turned up end portion 4e of the carcass layer 4 to the body portion of the carcass layer 4 is 8 mm or more. A steel reinforced layer 11 including a plurality of steel cords is disposed in each of the bead portions 3 in such a way as to wrap around the carcass layer 4, the bead core 5, and the bead filler 6. Furthermore, a sidewall rubber layer 12 exposed on the tire outer surface is disposed in a region extending from the sidewall portion 2 to the bead portion 3.

Additionally, an edge tape 13 made of rubber covers the turned up end portion 4e of the carcass layer 4 and a tire width direction outer end portion 11e of the steel reinforced layer 11. The edge tape 13 is not necessarily required, but is effective from the perspective of separation prevention. The edge tape 13 has a thickness of from 0.5 mm to 1.8 mm and covers the metal cross section of the steel cord exposed at the turned up end portion 4e of the carcass layer 4 and the end portion 11e of the steel reinforced layer 11. The edge tape 13 preferably has an elongation at break of 300% or more and a 100% modulus of 5.0 MPa or more.

A rubber reinforcing support layer 14 is disposed between the bead filler 6 and the sidewall rubber layer 12. The rubber reinforcing support layer 14 is disposed covering the turned up end portion 4e of the carcass layer 4 and the end portion 11e of the steel reinforced layer 11, and at least extends from a position lateral to the bead core 5 toward the radially outer side, and contacts the body portion of the carcass layer 4 at a position on the radially outer side with respect to the radially outer side end portion 6e of the bead filler 6. The rubber reinforcing support layer 14 needs to be at least present at a position lateral to the bead core 5, but may wrap around to the radially inner side of the bead core 5 and extend to the bead toe as illustrated in FIG. 2. The 100% modulus $K_{M100}$ of the rubber reinforcing support layer 14 is set at least 1.5 times and preferably at least 1.7 times as large as each of the 100% modulus $BF_{M100}$ of the bead filler 6 and the 100% modulus $S_{M100}$ of the sidewall rubber layer 12.

According to the pneumatic tire described above, the rubber reinforcing support layer 14 covering the turned up end portion 4e of the carcass layer 4 and the end portion 11e of the steel reinforced layer 11 is disposed between the bead filler 6 and the sidewall rubber layer 12, the rubber reinforcing support layer 14 at least extends from the position lateral to the bead core 5 toward the radially outer side and contacts the body portion of the carcass layer 4 at the position on the radially outer side with respect to the radially outer side end portion 6e of the bead filler 6, and the 100% modulus $K_{M100}$ of the rubber reinforcing support layer 14 is set at least 1.5 times as large as the 100% modulus $BF_{M100}$ of bead filler 6 and 100% modulus $S_{M100}$ of the sidewall rubber layer 12, the bead filler 6 and the sidewall rubber layer 12 being adjacent to the rubber reinforcing support layer. Thus, the rubber reinforcing support layer 14 effectively suppresses a flow of rubber present laterally to the bead core 5, toward the tire outer diameter side during vulcanization. As a result, it is possible to suppress a reduction in thickness of the rubber present on the side of the bead core 5 and an increase in thickness of the rubber present on the outer side in the tire width direction of the turned up end portion 4e of the carcass layer 4 is suppressed, and the carcass line of the bead portion 3 of the pneumatic tire can be brought closer to the target balanced profile. In addition, the rubber reinforcing support layer 14 suppresses a rubber flow in the bead portion 3, and thus trapping of a release agent and the like caused by the rubber flow is prevented, allowing suppression of cracking of a bead portion surface during an initial traveling stage. By thus providing the bead portion 3 with an appropriate carcass line and suppressing cracking caused by the rubber flow, the durability of the bead portions can be improved.

In the pneumatic tire described above, the rubber reinforcing support layer 14 may have a 100% modulus $K_{M100}$ of from 4.5 MPa to 10.0 MPa. Accordingly, the rubber flow during vulcanization is effectively suppressed, allowing suppression of cracking of a bead portion surface during the initial traveling stage. When the 100% modulus $K_{M100}$ of the rubber reinforcing support layer 14 is less than 4.5 MPa, the effect of reinforcing and supporting the sidewall rubber layer 12 is insufficient, preventing effective suppression of the rubber flow in the sidewall rubber layer 12 and the rubber reinforcing support layer 14. Additionally, when the 100% modulus $K_{M100}$ of the rubber reinforcing support layer 14 is more than 10.0 MPa, the rubber reinforcing support layer 14 is excessively rigid. This may increase strain at the turned up end portion 4e caused by displacement of the body portion of the carcass layer 4 at the time of contact with the ground, causing separation originating from the turned up end portion 4e. In particular, the 100% modulus $K_{M100}$ of the rubber reinforcing support layer 14 preferably ranges from 6.0 MPa to 9.0 MPa. Note that, in a case where the 100% modulus $K_{M100}$ of the rubber reinforcing support layer 14 is increased, the Mooney viscosity in the unvulcanized state tends to increase but the Mooney viscosity in the unvulcanized state defined by JIS-K6300-1 preferably ranges from 70 to 100 (ML(1+4)100° C.).

In the pneumatic tire described above, as illustrated in FIG. 3, the rubber reinforcing support layer 14 may have a thickness $T_K$ of from 2.0 mm to 6.0 mm in a region X from the turned up end portion 4e of the carcass layer 4 to the radially outer side end portion 6e of the bead filler 6. Accordingly, the rubber flow during vulcanization is effectively suppressed, allowing suppression of cracking of a bead portion surface during the initial traveling stage. Note that the thickness TK of the rubber reinforcing support layer 14 is a thickness measured in a direction orthogonal to a center line passing through a center position of the rubber reinforcing support layer 14 in the thickness direction.

When the thickness TK of the rubber reinforcing support layer 14 is less than 2.0 mm, the effect of reinforcing and supporting the sidewall rubber layer 12 is insufficient, preventing effective suppression of the rubber flow in the sidewall rubber layer 12 and the rubber reinforcing support layer 14. Additionally, when the thickness TK of the rubber reinforcing support layer 14 is more than 6.0 mm, the rubber reinforcing support layer 14 is excessively rigid, and thus strain amplitude in the tire radial direction may increase at the turned up end portion 4e of the carcass layer 4, causing separation originating from the turned up end portion 4e. In particular, the thickness TK of the rubber reinforcing support layer 14 preferably ranges from 2.5 mm to 5.0 mm.

In the pneumatic tire described above, as illustrated in FIG. 3, a distance A measured along a straight line D extending through an apex E of the bead core 5 projecting farthest to the outer side in the width direction, the straight line extending parallel to the long sides of the bead core 5 and the distance A being measured from the apex E to a bead heel position, may be 2.5 mm or more, and the shortest distance $T_1$ from the turned up end portion 4e of the carcass layer 4 to an outer surface of the bead portion 3 may be 10 mm or less. This allows formation of a carcass line less susceptible to a profile change caused by air pressure inflation (a balanced profile), and thus the strain amplitude at the turned up end portion 4e of the carcass layer 4 is suppressed, allowing effective suppression of separation of the carcass layer 4 originating from the turned up end portion 4e.

Note that a specific determination of the distance A is as follows. The bead core 5 has a multilayer structure in which a plurality of wires are arranged in a tire meridian cross-section. The apex E is a point where a straight line extending through the center of gravity of a wire located on the outermost side of the bead core 5 in the width direction, the straight line being parallel to the long sides of the bead core 5, meets the contour of the wire located on the outermost side in the width direction. In a case where a straight line D, a virtual intersection point H, a straight line J, and a straight line F are determined; the straight line D extending through the apex E of the bead core 5 projecting farthest to the outer side in the width direction, the straight line D that is parallel to the long sides of the bead core 5, the virtual intersection point H is a point where an extension line of a side P forming the profile of a bead bottom surface meets an extension line of a curve G forming the profile of a bead back surface, the straight line J extending through the virtual intersection point H and being orthogonal to the straight line D, and the straight line F extending through the apex E and being orthogonal to the straight line D, the distance A is the length of a line segment on the straight line D defined between the straight line J and the straight line F.

When the distance A is more than 2.5 mm, the position of the bead core 5 is located on the bead heel side, and thus the carcass line from the bead core 5 to the turned up end portion 4e of the carcass layer 4 is a line standing in the tire radial direction. In other words, the carcass line exhibits a significant profile change between before and after air pressure inflation. In particular, the distance A is preferably 3.0 mm or more, and the upper limit of the distance A may be 8.0 mm. On the other hand, when the shortest distance $T_1$ from the turned up end portion 4e of the carcass layer 4 to the outer surface of the bead portion 3 is more than 10 mm, the carcass line of the body portion of the carcass layer 4 protrudes toward the tire inner side in order to keep the shortest distance $T_{BF}$ from the turned up end portion 4e of the carcass layer 4 to the body portion of the carcass layer 4 comparable with the shortest distance $T_1$. Thus, the carcass line is susceptible to a significant profile change between before and after air pressure inflation. In particular, the shortest distance $T_1$ is preferably 9.0 mm or less.

In the pneumatic tire described above, as illustrated in FIG. 4, the shortest distance $T_{BF}$ from the turned up end portion 4e of the carcass layer 4 to the body portion of the carcass layer 4 and the shortest distance $T_1$ from the turned up end portion 4e of the carcass layer 4 to the outer surface of the bead portion 3 preferably satisfy a relationship $0.50 \leq T_1/T_{BF} \leq 0.65$. This effectively suppresses separation of the carcass layer 4 originating from the turned up end portion 4e and also suppresses trapping of rubber at or near the turned up end portion 4e of the carcass layer 4, allowing suppression of cracking of the bead portion surface during the initial traveling stage.

When $T_1/T_{BF}$ is less than 0.5, the turned up end portion 4e of the carcass layer 4 is disposed on a compression side with respect to a neutral axis of bending deformation of the bead portion 3 during vulcanization. Thus, the rubber is likely to be trapped at or near the turned up end portion 4 of the carcass layer 4, and the bead portion surface may be cracked during the initial traveling stage. In contrast, when $T_1/T_{BF}$ is more than 0.65, the thickness of the bead filler 6 corresponding to the shortest distance $T_{BF}$ is reduced to increase the strain amplitude at the turned up end portion 4e of the carcass layer 4 in the tire radial direction, and separation of the carcass layer 4 may originate from the turned up end portion 4e.

In the pneumatic tire described above, as illustrated in FIG. 4, the distance $P_h$ from the center of the bead core 5 to the turned up end portion 4e of the carcass layer 4 may range from 26.0 mm to 40.0 mm, the shortest distance $T_{BF}$ from the turned up end portion 4e of the carcass layer 4 to the body portion of the carcass layer 4 may be 11.0 mm or more, and the shortest distance $T_1$ from the turned up end portion 4e of the carcass layer 4 to the outer surface of the bead portion 3 may be 7.0 mm or more. This allows effective suppression of separation of the carcass layer 4 originating from the turned up end portion 4e. Note that the center of the bead core 5 is the intersection point between diagonal lines of a virtual quadrangle formed by joining center points of the four wires of the wires constituting the bead core 5 in a case where the wires are selected to maximize the area of the virtual rectangle.

When the distance $P_h$ from the center of the bead core 5 to the turned up end portion 4e of the carcass layer 4 is less than 26.0 mm, the carcass layer 4 may get pulled out. In contrast, when the distance $P_h$ is more than 40.0 mm, the turned up end portion 4e of the carcass layer 4 is disposed in a region of the bead portion 3 where significant deformation occurs, and thus separation of the carcass layer may originate from the 4 turned up end portion 4e. In particular, the distance $P_h$ from the center of the bead core 5 to the turned up end portion 4e of the carcass layer 4 is preferably 28.0 mm to 38.0 mm. Additionally, when the shortest distance $T_{BF}$ from the turned up end portion 4e of the carcass layer 4 to the body portion of the carcass layer 4 is less than 11.0 mm, or the shortest distance $T_1$ from the turned up end portion 4e of the carcass layer 4 to the outer surface of the bead portion 3 is less than 7.0 mm, an insufficient rubber volume may increase the strain amplitude at the turned up end portion 4e of the carcass layer 4 in the tire radial direction, causing separation of the carcass layer 4 originating from the turned up end portion 4e. The upper limit value of the shortest distance $T_{BF}$ may be 18.0 mm.

In the pneumatic tire described above, as illustrated in FIG. 4, the distance $P_h$ from the center of the bead core 5 to the turned up end portion 4e of the carcass layer 4 and the distance $S_{ho}$ from the center of the bead core 5 to the end portion 11e of the steel reinforced layer 11 may satisfy a relationship 5.0 mm≤$P_h$-$S_{ho}$. This mitigates the stress concentration at the turned up end portion 4e of the carcass layer 4 and at the end portion 11e of the steel reinforced layer 11, allowing effective suppression of separation originating from the end portions 4e and 11e. When the value of $P_h$-$S_{ho}$ is less than 5 mm, the strain at the turned up end portion 4e of the carcass layer 4 increases, and separation of the carcass layer 4 may originate from the turned up end portion 4e.

Figure 5:
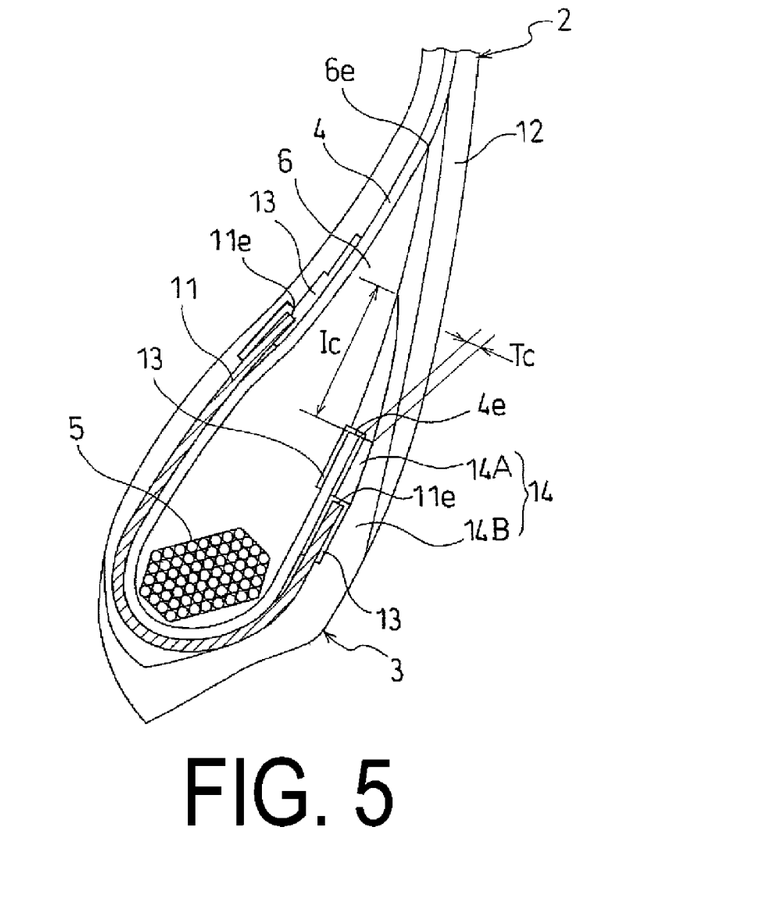
FIG. 5 is a cross-sectional view illustrating a modified example of the bead portion.
Figure 6:
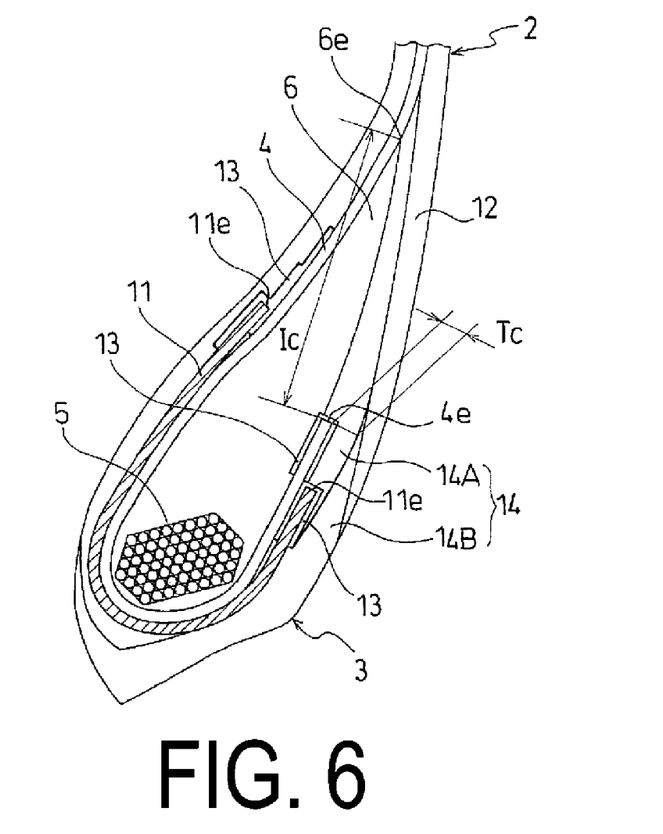
FIG. 6 is a cross-sectional view illustrating another modified example of the bead portion.

FIGS. 5 and 6 each illustrate a modified example of the bead portion. In FIGS. 5 and 6, the rubber reinforcing support layer 14 includes a crack suppression layer 14A contacting the turned up end portion 4e of the carcass layer 4 and the tire width direction outer end portion 11e of the steel reinforced layer 11, and a rubber reinforcing body layer 14B contiguous with the crack suppression layer 14A. The crack suppression layer 14A and the rubber reinforcing body layer 14B are formed from different types of rubber compositions. The crack suppression layer 14A has an elongation at break KcEB of 300% or more, and the rubber reinforcing body layer 14B has a 100% modulus $Km_{M100}$ greater than the 100% modulus $Kc_{M100}$ of the crack suppression layer. Note that, in a case where the rubber reinforcing support layer 14 includes the crack suppression layer 14A and the rubber reinforcing body layer 14B, the 100% modulus $K_{M100}$ of the rubber reinforcing support layer 14 has a value equal to the value of the 100% modulus $Km_{M100}$ of the rubber reinforcing body layer 14B.

In a case where the rubber reinforcing support layer 14 thus includes the crack suppression layer 14A and the rubber reinforcing body layer 14B, separation can be effectively suppressed by increasing the elongation at break $Kc_{EB}$ of the crack suppression layer, which contacts the turned up end portion 4e of the carcass layer 4 and an end portion 11e of the steel reinforced layer 11. On the other hand, for the rubber reinforcing body layer 14, the 100% modulus $Km_{M100}$ can be increased with a decrease in elongation at break allowed, thus suppressing the rubber flow during vulcanization to allow effective suppression of cracking of the bead portion surface during the initial traveling stage. When the elongation at break $Kc_{EB}$ of the crack suppression layer 14A is less than 300%, the effect of suppressing separation is reduced. The upper limit value of the elongation at break $Kc_{EB}$ of the crack suppression layer 14A may be 500%.

The embodiments in FIGS. 5 and 6 differ from each other in the distribution of the rubber volume between the crack suppression layer 14A and the rubber reinforcing body layer 14B. However, the distribution of the rubber volume can be selected in a discretionary manner as long as the crack suppression layer 14A contacts the turned up end portion 4e of the carcass layer 4 and the tire width direction outer end portion 11e of the steel reinforced layer 11. Additionally, in the embodiments in FIGS. 5 and 6, a tire width direction inner end portion 11e of the steel reinforced layer 11 is also covered with the edge tape 13. The edge tape 13 as described above can be added in a discretionary manner.

In the pneumatic tire described above, the crack suppression layer 14A may have a length Ic of 30 mm or more in a region from the turned up end portion 4e of the carcass layer 4 to the radially outer side end portion 6e of the bead filler 6, and the crack suppression layer 14A may have a thickness Tc of 3.0 mm or more at the turned up end portion 4e of the carcass layer 4. This allows effective suppression of separation of the carcass layer 4 originating from the turned up end portion 4e and separation of the steel reinforced layer 11 originating from the end portion 11e. Note that the length Ic and the thickness Tc of the crack suppression layer 14A correspond to thicknesses including the thickness of the edge tape 13.

When the length Ic of the crack suppression layer 14A is less than 30 mm, the effect of suppressing separation is reduced. Additionally, when the thickness Tc of the crack suppression layer 14A at the turned up end portion 4e of the carcass layer 4 is less than 3.0 mm, the effect of suppressing separation is reduced.

Figure 7:
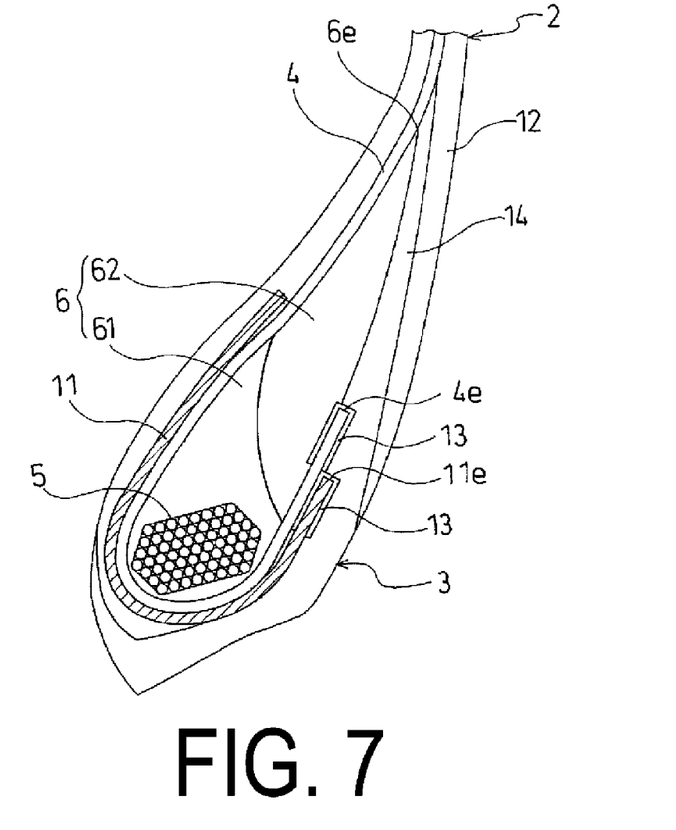
FIG. 7 is a cross-sectional view illustrating yet another modified example of the bead portion.

FIG. 7 illustrates another modified example of the bead portion. In FIG. 7, the bead filler 6 includes a hard filler layer 61 located on the radially inner side and a soft filler layer 62 located on the radially outer side, and the hard filler layer 61 has a 100% modulus $B1_{M100}$ set within a range from 6.0 MPa to 18.0 MPa, and the soft filler layer 62 has a 100% modulus $B2_{M100}$ set within a range from 1.0 MPa to 6.0 MPa. More specifically, the turned up end portion 4e of the carcass layer 4 terminates at a position adjacent to the soft filler layer 62. This allows effective suppression of separation of the carcass layer 4 originating from the turned up end portion 4e. Note that, in a case where the bead filler 6 includes the hard filler layer 61 and the soft filler layer 62, the 100% modulus $BF_{M100}$ of the bead filler 6 has a value equal to the value of the 100% $B2_{M100}$ of the soft filler layer 62.

When the 100% modulus $B1_{M100}$ of the hard filler layer 61 is less than 6.0 MPa, the bead portion 3 is excessively flexed when a load is applied, and thus separation of the carcass layer 4 may originate from the turned up end portion 4e. Additionally, when the 100% modulus $B1_{M100}$ of the hard filler layer 61 is more than 18.0 MPa, separation may occur between the body portion of the carcass layer 4 and the hard filler layer 61. In particular, the 100% modulus $B1_{M100}$ of the hard filler layer 61 preferably ranges from 8.0 MPa to 16.0 MPa.

On the other hand, when the 100% modulus $B2_{M100}$ of the soft filler layer 62 is less than 1.0 MPa, the bead portion 3 is excessively flexed when a load is applied, and thus separation of the carcass layer 4 may originate from the turned up end portion 4e. Additionally, when the 100% modulus $B2_{M100}$ of the soft filler layer 62 is more than 6.0 MPa, the strain at the turned up end portion 4e of the carcass layer 4 increases, and thus separation of the carcass layer 4 may originate from the turned up end portion 4e. In particular, the 100% modulus $B2_{M100}$ of the soft filler layer 62 preferably ranges from 2.0 MPa to 5.0 MPa.

The pneumatic tire according to the embodiment described above may have a load index of 121 or more on a single wheel or a ply rating of 10 PR or more. In pneumatic tires having such a load index or ply rating, improving the durability of the bead portions is extremely meaningful.

EXAMPLES

Pneumatic tires according to Conventional Example, Comparative Examples 1 and 2, and Examples 1 to 18 were manufactured. The tires had a tire size of 275/70R22.5, included a tread portion, a pair of sidewall portions, and a pair of bead portions, and included a carcass layer mounted between the pair of bead portions and including a plurality of steel cords, the carcass layer being turned up around a bead core of each of the bead portions from a tire inner side to a tire outer side, the tires differing from one another only in the structure of the bead portions.

In the tires according to Conventional Example, Comparative Examples 1 and 2, and Examples 1 to 18, the following were set as indicated in Tables 1 and 2: presence of contact of the rubber reinforcing support layer with the carcass layer body portion, the ratio $K_{M100}/BF_{M100}$ of the 100% modulus $K_{M100}$ of the rubber reinforcing support layer to the 100% modulus $BF_{M100}$ of the bead filler, the ratio $K_{M100}/S_{M100}$ of the 100% modulus $K_{M100}$ of the rubber reinforcing support layer to the 100% modulus $S_{M100}$ of the sidewall rubber layer, the 100% modulus $K_{M100}$ of the rubber reinforcing support layer, the thickness $T_K$ of the rubber reinforcing support layer, the elongation at break $Kc_{EB}$ of the crack suppression layer, the 100% modulus $Km_{M100}$ of the rubber reinforcing body layer, the 100% modulus $Kc_{M100}$ of the crack suppression layer, the length Ic of the crack suppression layer, the thickness Tc of the crack suppression layer, the distance A of the bead core, the shortest distance $T_1$ from the turned up end portion of the carcass layer to the outer surface of the bead portion, $T_1/T_{BF}$, the distance $P_h$ from the center of the bead core to the turned up end portion of the carcass layer, the shortest distance $T_{BF}$ from the turned up end portion of the carcass layer to the body portion of the carcass layer, the distance $S_{ho}$ from the center of the bead core to the end portion of the steel reinforced layer, the $P_h$-$S_{ho}$, the 100% modulus $B1_{M100}$ of the hard filler layer, and 100% modulus $B2_{M100}$ of the soft filler layer.

For these test tires, the durability of the bead portions was evaluated using a test method described below, and the results are indicated in Tables 1 and 2.

Durability of Bead Portions:

Each of the test tires was mounted on a rim specified by JATMA (The Japan Automobile Tyre Manufacturers Association, Inc.), inflated to 75% of the air pressure specified by JATMA, and subjected to a load 1.4 times as heavy as the load specified by JATMA, and running tests were performed on a drum testing machine at a running speed of 49 km/h. After 40,000 km of running, the circumferential lengths of cracks formed on the surfaces of both bead portions were measured. In addition, each test tire was cut at eight locations at equal intervals in the tire circumferential direction along the tire meridian, and the cross-sectional direction lengths of cracks originating from the turned up end portion of the carcass layer were measured in cut surfaces at the eight locations of both bead portions (a total of 16 locations). Furthermore, the sum of the circumferential length of the cracks in the bead portion surface and the cross-sectional direction lengths of the cracks in the bead portion cross section was determined. The evaluation results were expressed, using the reciprocal of the measurement values, as index values with the value of the Conventional Example being defined as 100. Larger index values indicate superior durability of the bead portion.

TABLE 1

|  | Conventional Example | Example 1 | Comparative Example 1 |
|---|---|---|---|
| Contact of rubber reinforcing support layer with carcass layer body portion | No | Yes | No |
| $K_{M100}/BF_{M100}$ | — | 2.9 | 2.9 |
| $K_{M100}/S_{M100}$ | — | 3.8 | 3.8 |
| Modulus $K_{M100}$ (MPa) of rubber reinforcing support layer | — | 8.0 | 8.0 |
| Thickness $T_K$ (mm) of rubber reinforcing support layer | — | 3.5 | 3.5 |
| Elongation at break $Kc_{EB}$ (%) of crack suppression layer | — | 370 | 370 |
| Modulus $Km_{M100}$ (MPa) of rubber reinforcing body layer | — | 8.0 | 8.0 |
| Modulus $Kc_{M100}$ (MPa) of crack suppression layer | — | 5.5 | 5.5 |
| Length Ic (mm) of crack suppression layer | — | 50 | 50 |
| Thickness Tc (mm) of crack suppression layer | — | 3.5 | 3.5 |
| Distance A (mm) of bead core | 0.0 | 3.6 | 2.0 |
| Shortest distance $T_1$ (mm) | 7.6 | 8.5 | 8.5 |
| $T_1/T_{BF}$ | 0.54 | 0.61 | 0.61 |
| Distance $P_h$ (mm) | 33.0 | 33.0 | 33.0 |
| Shortest distance $T_{BF}$ (mm) | 14.0 | 14.0 | 14.0 |
| Distance $S_{ho}$ (mm) | 23.0 | 23.0 | 23.0 |
| $P_h$ - $S_{ho}$ | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 100 | 180 | 120 |

|  | Comparative Example 2 | Example 2 | Example 3 | Example 4 |
|---|---|---|---|---|
| Contact of rubber reinforcing support layer with carcass layer body portion | Yes | Yes | Yes | Yes |
| $K_{M100}/BF_{M100}$ | 1.0 | 1.5 | 4.3 | 2.9 |
| $K_{M100}/S_{M100}$ | 1.3 | 2.0 | 5.7 | 3.8 |
| Modulus $K_{M100}$ (MPa) of rubber reinforcing support layer | 2.8 | 4.2 | 12.0 | 8.0 |
| Thickness $T_K$ (mm) of rubber reinforcing support layer | 3.5 | 3.5 | 3.5 | 1.5 |

TABLE 1-continued

|  |  |  |  |  |
|---|---|---|---|---|
| Elongation at break $Kc_{EB}$ (%) of crack suppression layer | 450 | 370 | 370 | 370 |
| Modulus $Km_{M100}$ (MPa) of rubber reinforcing body layer | 2.8 | 4.2 | 12.0 | 8.0 |
| Modulus $Kc_{M100}$ (MPa) of crack suppression layer | 2.8 | 5.5 | 5.5 | 5.5 |
| Length Ic (mm) of crack suppression layer | 50 | 50 | 50 | 50 |
| Thickness Tc (mm) of crack suppression layer | 3.5 | 3.5 | 3.5 | 3.5 |
| Distance A (mm) of bead core | 0.5 | 3.6 | 3.6 | 3.6 |
| Shortest distance $T_1$ (mm) | 12.0 | 8.5 | 8.5 | 8.5 |
| $T_1/T_{BF}$ | 0.86 | 0.61 | 0.61 | 0.61 |
| Distance $P_h$ (mm) | 33.0 | 33.0 | 33.0 | 33.0 |
| Shortest distance $T_{BF}$ (mm) | 14.0 | 14.0 | 14.0 | 14.0 |
| Distance $S_{ho}$ (mm) | 23.0 | 23.0 | 23.0 | 23.0 |
| $P_h - S_{ho}$ | 10.0 | 10.0 | 10.0 | 10.0 |
| Modulus $B1_{M100}$ (MPa) of hard filler layer | 12.6 | 12.6 | 12.6 | 12.6 |
| Modulus $B2_{M100}$ (MPa) of soft filler layer | 2.8 | 2.8 | 2.8 | 2.8 |
| Durability (index) of bead portions | 100 | 135 | 175 | 140 |

|  | Example 5 | Example 6 | Example 7 | Example 8 |
|---|---|---|---|---|
| Contact of rubber reinforcing support layer with carcass layer body portion | Yes | Yes | Yes | Yes |
| $K_{M100}/BF_{M100}$ | 2.9 | 2.9 | 2.9 | 2.9 |
| $K_{M100}/S_{M100}$ | 3.8 | 3.8 | 3.8 | 3.8 |
| Modulus $K_{M100}$ (MPa) of rubber reinforcing support layer | 8.0 | 8.0 | 8.0 | 8.0 |
| Thickness $T_K$ (mm) of rubber reinforcing support layer | 7.0 | 3.5 | 3.5 | 3.5 |
| Elongation at break $Kc_{EB}$ (%) of crack suppression layer | 370 | 200 | 370 | — |
| Modulus $Km_{M100}$ (MPa) of rubber reinforcing body layer | 8.0 | 8.0 | 8.0 | 8.0 |
| Modulus $Kc_{M100}$ (MPa) of crack suppression layer | 5.5 | 10.0 | 5.5 | — |
| Length Ic (mm) of crack suppression layer | 50 | 50 | 10 | — |
| Thickness Tc (mm) of crack suppression layer | 3.5 | 3.5 | 1.0 | — |
| Distance A (mm) of bead core | 3.6 | 3.6 | 3.6 | 3.6 |
| Shortest distance $T_1$ (mm) | 8.5 | 8.5 | 8.5 | 8.5 |
| $T_1/T_{BF}$ | 0.61 | 0.61 | 0.61 | 0.61 |
| Distance $P_h$ (mm) | 33.0 | 33.0 | 33.0 | 33.0 |
| Shortest distance $T_{BF}$ (mm) | 14.0 | 14.0 | 14.0 | 14.0 |
| Distance $S_{ho}$ (mm) | 23.0 | 23.0 | 23.0 | 23.0 |
| $P_h - S_{ho}$ | 10.0 | 10.0 | 10.0 | 10.0 |
| Modulus $B1_{M100}$ (MPa) of hard filler layer | 12.6 | 12.6 | 12.6 | 12.6 |
| Modulus $B2_{M100}$ (MPa) of soft filler layer | 2.8 | 2.8 | 2.8 | 2.8 |
| Durability (index) of bead portions | 140 | 148 | 153 | 150 |

TABLE 2

|  | Example 9 | Example 10 | Example 11 | Example 12 | Example 13 |
|---|---|---|---|---|---|
| Contact of rubber reinforcing support layer with carcass layer body portion | Yes | Yes | Yes | Yes | Yes |
| $K_{M100}/BF_{M100}$ | 2.9 | 2.9 | 2.9 | 2.9 | 2.9 |
| $K_{M100}/S_{M100}$ | 3.8 | 3.8 | 3.8 | 3.8 | 3.8 |
| Modulus $K_{M100}$ (MPa) of rubber reinforcing support layer | 8 | 8 | 8 | 8 | 8 |
| Thickness $T_K$ (mm) of rubber reinforcing support layer | 3.5 | 3.5 | 3.5 | 3.5 | 3.5 |
| Elongation at break $Kc_{EB}$ (%) of crack suppression layer | 370 | 370 | 370 | 370 | 370 |
| Modulus $Km_{M100}$ (MPa) of rubber reinforcing body layer | 8 | 8 | 8 | 8 | 8 |
| Modulus $Kc_{M100}$ (MPa) of crack suppression layer | 5.5 | 5.5 | 5.5 | 5.5 | 5.5 |

TABLE 2-continued

|  |  |  |  |  |  |
|---|---|---|---|---|---|
| Length Ic (mm) of crack suppression layer | 50 | 50 | 50 | 50 | 50 |
| Thickness Tc (mm) of crack suppression layer | 3.5 | 3.5 | 3.5 | 3.5 | 3.5 |
| Distance A (mm) of bead core | 1 | 3.6 | 3.6 | 3.6 | 3.6 |
| Shortest distance $T_1$ (mm) | 8.5 | 11.5 | 8.5 | 8.5 | 5 |
| $T_1/T_{BF}$ | 0.61 | 0.82 | 0.5 | 0.85 | 0.36 |
| Distance $P_h$ (mm) | 33 | 33 | 23 | 42 | 33 |
| Shortest distance $T_{BF}$ (mm) | 14 | 14 | 17 | 10 | 14 |
| Distance $S_{ho}$ (mm) | 23 | 23 | 23 | 23 | 23 |
| $P_h - S_{ho}$ | 10 | 10 | 0 | 19 | 10 |
| Modulus $B1_{M100}$ (MPa) of hard filler layer | 12.6 | 12.6 | 12.6 | 12.6 | 12.6 |
| Modulus $B2_{M100}$ (MPa) of soft filler layer | 2.8 | 2.8 | 2.8 | 2.8 | 2.8 |
| Durability (index) of bead portions | 158 | 167 | 170 | 169 | 171 |

|  | Example 14 | Example 15 | Example 16 | Example 17 | Example 18 |
|---|---|---|---|---|---|
| Contact of rubber reinforcing support layer with carcass layer body portion | Yes | Yes | Yes | Yes | Yes |
| $K_{M100}/BF_{M100}$ | 2.9 | 2.9 | 2.9 | 10 | 1 |
| $K_{M100}/S_{M100}$ | 3.8 | 3.8 | 3.8 | 3.8 | 3.8 |
| Modulus $K_{M100}$ (MPa) of rubber reinforcing support layer | 8 | 8 | 8 | 8 | 8 |
| Thickness $T_K$ (mm) of rubber reinforcing support layer | 3.5 | 3.5 | 3.5 | 3.5 | 3.5 |
| Elongation at break $Kc_{EB}$ (%) of crack suppression layer | 370 | 370 | 370 | 370 | 370 |
| Modulus $Km_{M100}$ (MPa) of rubber reinforcing body layer | 8 | 8 | 8 | 8 | 8 |
| Modulus $Kc_{M100}$ (MPa) of crack suppression layer | 5.5 | 5.5 | 5.5 | 5.5 | 5.5 |
| Length Ic (mm) of crack suppression layer | 50 | 50 | 50 | 50 | 50 |
| Thickness Tc (mm) of crack suppression layer | 3.5 | 3.5 | 3.5 | 3.5 | 3.5 |
| Distance A (mm) of bead core | 3.6 | 3.6 | 3.6 | 3.6 | 3.6 |
| Shortest distance $T_1$ (mm) | 8.5 | 8.5 | 8.5 | 8.5 | 8.5 |
| $T_1/T_{BF}$ | 0.61 | 0.61 | 0.61 | 0.61 | 0.61 |
| Distance $P_h$ (mm) | 33 | 33 | 33 | 33 | 33 |
| Shortest distance $T_{BF}$ (mm) | 14 | 14 | 14 | 14 | 14 |
| Distance $S_{ho}$ (mm) | 30 | 23 | 23 | 23 | 23 |
| $P_h - S_{ho}$ | 3 | 10 | 10 | 10 | 10 |
| Modulus $B1_{M100}$ (MPa) of hard filler layer | 12.6 | 4 | 20 | 12.6 | 12.6 |
| Modulus $B2_{M100}$ (MPa) of soft filler layer | 2.8 | 2.8 | 2.8 | 0.8 | 8 |
| Durability (index) of bead portions | 175 | 176 | 176 | 178 | 178 |

As can be seen from Tables 1 and 2, the tires of Examples 1 to 18 have improved the durability of the bead portions compared to that of Conventional Example. On the other hand, the tires of Comparative Examples 1 and 2 are not sufficiently effective for improving the durability of the bead portions.

The invention claimed is:

1. A pneumatic tire, comprising:
a tread portion extending in a tire circumferential direction and having an annular shape;
a pair of sidewall portions respectively disposed on both sides of the tread portion;
a pair of bead portions each disposed on an inner side in a tire radial direction of the sidewall portions; and
a carcass layer mounted between the pair of bead portions and comprising a plurality of steel cords, the carcass layer being turned up around a bead core of each of the bead portions from a tire inner side to a tire outer side,
a bead filler being disposed on an outer circumference of the bead core of each of the bead portions, a turned up end portion of the carcass layer being disposed on a radially inner side with respect to a radially outer side end portion of the bead filler, the turned up end portion of the carcass layer being spaced apart from a body portion of the carcass layer, a steel reinforced layer that comprises a plurality of steel cords being disposed in each of the bead portions in such a manner as to wrap around the carcass layer, the bead core, and the bead filler, and a sidewall rubber layer exposed on a tire outer surface being disposed from the sidewall portion to the bead portion, and
a rubber reinforcing support layer being disposed between the bead filler and the sidewall rubber layer in such a manner as to cover a turned up end portion of the carcass layer and an end portion of the steel reinforced layer while, on an outer side of the bead core in the tire width direction, extending only on one side of each of the carcass layer and the steel reinforced layer, the rubber reinforcing support layer at least extending from a position lateral to the bead core toward a radially outer side and contacting the body portion of the carcass layer at a position on a radially outer side with respect to a radially outer side end portion of the bead filler, and a 100% modulus $K_{M100}$ of the rubber reinforcing support layer being at least 1.5 times as large as each of a 100% modulus $BF_{M100}$ of the bead filler and a 100% modulus $S_{M100}$ of the sidewall rubber layer, the bead filler and the sidewall rubber layer being adjacent to the rubber reinforcing layer, wherein the distance $P_h$ from the center of the bead core to the turned up end portion of the carcass layer and a distance $S_{ho}$ from the center of the bead core to the end portion of the steel reinforced layer satisfies a relationship 5.0 mm≤$P_h$-$S_{ho}$≤12.0 mm, and a distance $P_h$ from a center of the bead core to the turned up end portion of the carcass layer ranges from 26.0 mm to 40.0 mm, the shortest distance $T_{BF}$ from the turned up end portion of the carcass layer to the body portion of the carcass layer is 11.0 mm or more, and the shortest distance $T_1$ from the turned up end portion of the carcass layer to the outer surface of the bead portion is 7.0 mm or more.

2. The pneumatic tire according to claim 1, wherein the rubber reinforcing support layer has a thickness $T_K$ of from 2.0 mm to 4.9 mm in a region from the turned up end portion of the carcass layer to the radially outer side end portion of the bead filler.

3. The pneumatic tire according to claim 1, wherein a distance A measured along a straight line extending through an apex of the bead core projecting farthest to the outer side in the width direction, the straight line extending parallel to a long side of the bead core and the distance A being measured from the apex to a bead heel position, is 2.5 mm or more, and a shortest distance $T_1$ from the turned up end portion of the carcass layer to an outer surface of the bead portion is 10 mm or less.

4. The pneumatic tire according to claim 1, wherein a shortest distance $T_{BF}$ from the turned up end portion of the carcass layer to the body portion of the carcass layer and the shortest distance $T_1$ from the turned up end portion of the carcass layer to the outer surface of the bead portion satisfy a relationship 0.50≤$T_1$/$T_{BF}$≤0.65.

5. The pneumatic tire according to claim 1, wherein the bead filler comprises a hard filler layer located on the radially inner side and a soft filler layer located on the radially outer side, the hard filler layer has a 100% modulus $B1_{M100}$ of from 6.0 MPa to 18.0 MPa, and the soft filler layer has a 100% modulus $B2_{M100}$ of from 1.0 MPa to 6.0 MPa.

6. The pneumatic tire according to claim 1, having a load index of 121 or more on a single wheel, or a ply rating of 10 PR or more.

7. The pneumatic tire according to claim 1, wherein the rubber reinforcing support layer is arranged to contact a rim when the pneumatic tire is mounted on a rim.

8. The pneumatic tire according to claim 1, wherein the rubber reinforcing support layer extends further radially inward than a position of the bead core.

9. The pneumatic tire according to claim 1, wherein the rubber reinforcing support layer wraps around the bead core from the tire inner side to the tire outer side.

10. The pneumatic tire according to claim 1, wherein the rubber reinforcing support layer has a 100% modulus $K_{M100}$ of from 4.5 MPa to 10.0 MPa.

11. The pneumatic tire according to claim 10, wherein the rubber reinforcing support layer has a thickness $T_K$ of from 2.0 mm to 6.0 mm in a region from the turned up end portion of the carcass layer to the radially outer side end portion of the bead filler.

12. The pneumatic tire according to claim 11, wherein the rubber reinforcing support layer comprises a crack suppression layer contacting the turned up end portion of the carcass layer and an end portion of the steel reinforced layer, and a rubber reinforcing body layer contiguous with the crack suppression layer, the crack suppression layer has an elongation at break $KC_{EB}$ of 300% or more, and a 100% modulus $Km_{M100}$ of the rubber reinforcing body layer is greater than a 100% modulus $Kc_{M100}$ of the crack suppression layer.

13. The pneumatic tire according to claim 12, wherein the crack suppression layer has a length Ic of 30 mm or more in a region from the turned up end portion of the carcass layer to the radially outer side end portion of the bead filler, and the crack suppression layer has a thickness Tc of 3.0 mm or more at the turned up end portion of the carcass layer.

14. The pneumatic tire according to claim 13, wherein a distance A measured along a straight line extending through an apex of the bead core projecting farthest to the outer side in the width direction, the straight line extending parallel to a long side of the bead core and the distance A being measured from the apex to a bead heel position, is 2.5 mm or more, and a shortest distance $T_1$ from the turned up end portion of the carcass layer to an outer surface of the bead portion is 10 mm or less.

15. The pneumatic tire according to claim 14, wherein a shortest distance $T_{BF}$ from the turned up end portion of the carcass layer to the body portion of the carcass layer and the shortest distance $T_1$ from the turned up end portion of the carcass layer to the outer surface of the bead portion satisfy a relationship 0.50≤$T_1$/$T_{BF}$≤0.65.

16. The pneumatic tire according to claim 15, wherein the bead filler comprises a hard filler layer located on the radially inner side and a soft filler layer located on the radially outer side, the hard filler layer has a 100% modulus $B1_{M100}$ of from 6.0 MPa to 18.0 MPa, and the soft filler layer has a 100% modulus $B2_{100}$ of from 1.0 MPa to 6.0 MPa.

17. The pneumatic tire according to claim 16, having a load index of 121 or more on a single wheel, or a ply rating of 10 PR or more.

18. A pneumatic tire, comprising:
a tread portion extending in a tire circumferential direction and having an annular shape;
a pair of sidewall portions respectively disposed on both sides of the tread portion;
a pair of bead portions each disposed on an inner side in a tire radial direction of the sidewall portions; and
a carcass layer mounted between the pair of bead portions and comprising a plurality of steel cords, the carcass layer being turned up around a bead core of each of the bead portions from a tire inner side to a tire outer side,
a bead filler being disposed on an outer circumference of the bead core of each of the bead portions, a turned up end portion of the carcass layer being disposed on a radially inner side with respect to a radially outer side end portion of the bead filler, the turned up end portion of the carcass layer being spaced apart from a body portion of the carcass layer, a steel reinforced layer that comprises a plurality of steel cords being disposed in each of the bead portions in such a manner as to wrap around the carcass layer, the bead core, and the bead filler, and a sidewall rubber layer exposed on a tire outer surface being disposed from the sidewall portion to the bead portion, and
a rubber reinforcing support layer being disposed between the bead filler and the sidewall rubber layer in such a manner as to cover a turned up end portion of the carcass layer and an end portion of the steel reinforced layer while, on an outer side of the bead core in the tire width direction, extending only on one side of each of the carcass layer and the steel reinforced layer, the rubber reinforcing support layer at least extending from a position lateral to the bead core toward a radially outer side and contacting the body portion of the carcass layer at a position on a radially outer side with respect to a radially outer side end portion of the bead filler, and a 100% modulus $K_{M100}$ of the rubber reinforcing support layer being at least 1.5 times as large as each of a 100% modulus $BF_{M100}$ of the bead filler and a 100% modulus $S_{M100}$ of the sidewall rubber layer, the bead filler and the sidewall rubber layer being adjacent to the rubber reinforcing layer, wherein the distance $P_h$ from the center of the bead core to the turned up end portion of the carcass layer and a distance $S_{ho}$ from the center of the bead core to the end portion of the steel reinforced layer satisfies a relationship 5.0 mm≤$P_h$-$S_{ho}$≤12.0 mm, and the rubber reinforcing support layer comprises a crack suppression layer contacting the turned up end portion of the carcass layer and an end portion of the steel reinforced layer, and a rubber reinforcing body layer contiguous with the crack suppression layer, the crack suppression layer has an elongation at break $KC_{EB}$ of 300% or more, and a 100% modulus $Km_{M100}$ of the rubber reinforcing body layer is greater than a 100% modulus $Kc_{M100}$ of the crack suppression layer.

19. The pneumatic tire according to claim 18, wherein the crack suppression layer has a length Ic of 30 mm or more in a region from the turned up end portion of the carcass layer to the radially outer side end portion of the bead filler, and the crack suppression layer has a thickness Tc of 3.0 mm or more at the turned up end portion of the carcass layer.

* * * * *